US012738047B2

(12) United States Patent
Lee et al.

(10) Patent No.: US 12,738,047 B2
(45) Date of Patent: Sep. 15, 2026

(54) METHOD AND DEVICE FOR QUANTIZING DEEP LEARNING NEURAL NETWORK MODEL BY CONSIDERING CHANGE IN EXTERNAL ENVIRONMENT

(71) Applicant: REBELLIONS INC., Seongnam-si (KR)

(72) Inventors: Won Jae Lee, Seoul (KR); Ji Eun Lim, Seoul (KR)

(73) Assignee: REBELLIONS INC., Seongnam-si (KR)

( * ) Notice: Subject to any disclaimer, the term of this patent is extended or adjusted under 35 U.S.C. 154(b) by 0 days.

(21) Appl. No.: 19/321,073

(22) Filed: Sep. 5, 2025

(65) Prior Publication Data

US 2026/0004575 A1 Jan. 1, 2026

Related U.S. Application Data

(63) Continuation of application No. PCT/KR2023/005242, filed on Apr. 18, 2023.

(30) Foreign Application Priority Data

Mar. 7, 2023 (KR) ........................ 10-2023-0030124

(51) Int. Cl.
*G06V 10/82* (2022.01)
*G06N 3/0495* (2023.01)

(52) U.S. Cl.
CPC ........... *G06V 10/82* (2022.01); *G06N 3/0495* (2023.01)

(58) Field of Classification Search
CPC ........ G06V 10/82; G06N 3/0495; G06N 3/04; G06N 3/045; G06N 3/0464; G06N 3/08; G06N 3/084; G06F 15/80; G06F 15/8046
See application file for complete search history.

(56) References Cited

U.S. PATENT DOCUMENTS

2019/0012559 A1* 1/2019 Desappan ........... G06F 18/2414
2019/0188557 A1* 6/2019 Lowell ................... G06N 3/063
(Continued)

FOREIGN PATENT DOCUMENTS

KR 10-2029852 B1 10/2019
KR 10-2021-0011461 A 2/2021
WO 2020/248424 A1 12/2020

OTHER PUBLICATIONS

Wan, "ALERT: Accurate Learning for Energy and Timeliness", 2020, USENIX, pp. 353-369 (Year: 2020).*
(Continued)

*Primary Examiner* — Oneal R Mistry
*Assistant Examiner* — Justin Philip Cascais
(74) *Attorney, Agent, or Firm* — BROADVIEW IP LAW, PC

(57) ABSTRACT

A quantization method of a deep learning neural network model is disclosed. An embodiment of the disclosure provides a quantization method comprising: detecting a feature change of input data caused by a change in an external environment, from input image data of a quantized deep learning neural network model based on a plurality of preset quantization parameters; performing quantization calibration for the deep learning neural network model to determine a new quantization parameter corresponding to the feature change of input data caused by the change in the external environment; and updating at least one of the plurality of preset quantization parameters based on the new quantization parameter.

13 Claims, 8 Drawing Sheets

(56) References Cited

U.S. PATENT DOCUMENTS

| | | | | |
|---|---|---|---|---|
| 2021/0064954 | A1* | 3/2021 | Choi | G06N 3/04 |
| 2021/0286688 | A1* | 9/2021 | Liu | G06F 11/1476 |
| 2021/0334142 | A1* | 10/2021 | Wang | G06N 3/0495 |

OTHER PUBLICATIONS

International Search Report for PCT/KR2023/005242 by Korean Intellectual Property Office dated Nov. 29, 2023.
Office Action for KR 10-2023-0030124 by Korean Intellectual Property Office dated Dec. 8, 2025.

* cited by examiner

METHOD AND DEVICE FOR QUANTIZING DEEP LEARNING NEURAL NETWORK MODEL BY CONSIDERING CHANGE IN EXTERNAL ENVIRONMENT

CROSS-REFERENCE TO RELATED APPLICATION

The present application is a continuation of International Application No. PCT/KR2023/005242, filed Apr. 18, 2023, which is based upon and claims priority to Korean Patent Application No. 10-2023-0030124, filed on Mar. 7, 2023, in Korean Intellectual Property Office. The entire disclosure of the above application is incorporated herein by reference.

TECHNICAL FIELD

The disclosure relates to a method and device for quantizing a deep learning neural network model by considering a change in an external environment, and more particularly, to a method and device for quantizing a deep learning neural network model that detects a feature change of input data of the deep learning neural network model caused by the change in the external environment and adaptively updates a quantization parameter based on the detected input feature change.

BACKGROUND

The content described below merely provides background information related to the present embodiment and does not constitute the related art.

As the performance of deep learning neural network model has been advanced in recent years, such deep learning neural network model has to perform a larger amount of computation on more data. Therefore, an AI accelerator is used to accelerate such a large amount of computation and to efficiently implement the deep learning neural network model on hardware.

The AI accelerator is a lightweight method of a deep learning neural network model for low power consumption and high efficiency, and quantization is applied. The quantization means reducing the size of the model by reducing the number of bits used to represent weight values or activation values present within the deep learning neural network. In this case, since lower bits of data are used in the computation process of the deep learning neural network model, the computation speed may be improved and power consumption may be reduced.

Quantization calibration is performed for quantizing the activation value of the deep learning neural network model. The quantization calibration is a process of determining a distribution of activation values of each layer with respect to multiple input data, and setting an optimal quantization range in which an error may be minimized through methods such as Kullback-Leibler (KL) divergence. For example, an optimal quantization threshold may be determined based on the distribution of activation values through quantization calibration, an activation value that is less than the quantization threshold may be mapped to a corresponding quantized value, and all of the activation values that are equal to or greater than the quantization threshold may be mapped to a maximum quantized value.

However, since the deep learning neural network model quantized through the above-described process is quantized based on the distribution of the data used for the quantization calibration, there is a problem that the performance is degraded as the feature of the actual input data differ from the feature of the data used in the calibration. For example, in the case of an object detection model, feature of actual input image data may vary greatly according to changes in external environments such as changes in day and night, or lighting, and the like, and feature of image data used for calibration may differ greatly. Therefore, as the feature change of input data increases, the quantization error increases, which leads to a decrease in the performance of the deep learning neural network model.

SUMMARY

A method and apparatus for quantizing a deep learning neural network model according to an embodiment are capable of detecting a feature change of input data caused by a change in an external environment, based on an activation map of input image data of the deep learning neural network model, and updating an existing quantization parameter of the deep learning neural network model to a new quantization parameter corresponding to the feature change of input data.

The problems to be solved by the disclosure are not limited to the problems mentioned above, and other problems not mentioned will be clearly understood by those skilled in the art from the following description.

According to an embodiment of the disclosure, there is provided a quantization method comprising: detecting a feature change of input data caused by a change in an external environment, from input image data of a quantized deep learning neural network model based on a plurality of preset quantization parameters; performing quantization calibration for the deep learning neural network model to determine a new quantization parameter corresponding to the feature change of input data caused by the change in the external environment; and updating at least one of the plurality of preset quantization parameters based on the new quantization parameter.

According to other embodiment of the disclosure, there is provided a quantization device, comprising: an input feature change detector configured to detect a feature change of input data caused by a change in an external environment in a quantized deep learning neural network model based on a plurality of preset quantization parameters; and a quantization unit configured to perform quantization calibration for the deep learning neural network model to determine a new quantization parameter corresponding to the feature change of input data caused by the change in the external environment as detected by the input feature change detector, and to update at least one quantization parameter among the plurality of preset quantization parameters based on the new quantization parameter.

According to an embodiment, the method and apparatus for quantizing a deep learning neural network model of the disclosure have an effect of preventing performance degradation caused by quantization error and improving inference accuracy of the deep learning neural network model by adaptively updating quantization parameters of the deep learning neural network model according to a feature change of input data caused by a change in an external environment.

DETAILED DESCRIPTION

Figure 1:
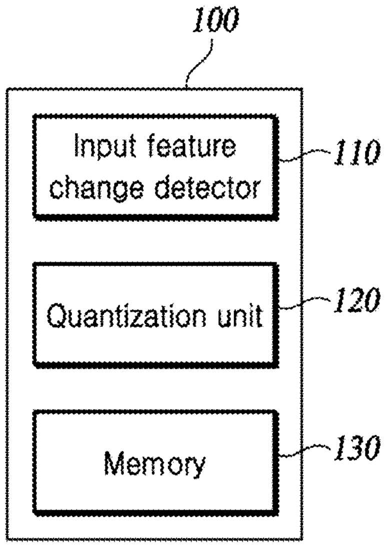
FIG. 1 is a block diagram of a quantization device according to an embodiment of the disclosure.

Hereinafter, some embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

The following detailed description, together with the accompanying drawings, is intended to describe exemplary embodiments of the present invention, and is not intended to represent the only embodiments in which the present invention may be practiced.

FIG. 1 is a block diagram of a quantization device according to an embodiment of the disclosure.

Referring to FIG. 1, a quantization device 100 according to an embodiment includes, in whole or in part, an input feature change detector 110, a quantization unit 120, and a memory 130.

All blocks shown in FIG. 1 are shown only with components related to embodiments of the disclosure, and are not essential components of the quantization device 100. In other embodiment, some blocks included in the quantization device 100 may be changed or deleted, or other component block may be further included in the quantization device 100.

The quantization device 100 may correspond to a computing device having various functions, such as searching for a deep learning neural network, or quantizing a 32-bit floating point-based deep learning neural network into a preset bit integer-based deep learning neural network, and the like. For example, the quantization device 100 may be implemented using various kinds of devices such as a GPU, an FPGA, or an ASIC.

The input feature change detector 110 detects a feature change of input data caused by a change in an external environment, from input image data of a deep learning neural network model that has been quantized based on plurality of preset quantization parameters.

The input data and the activation values output from each layer of the deep learning neural network model are quantized based on preset quantization parameters. Here, the preset quantization parameters may be quantization parameters determined based on a statistical distribution of activation values included in calibration data in an initial quantization calibration process, a scale factor S and a zero point Z. The plurality of preset quantization parameters may include input quantization parameters included in the deep learning neural network model and quantization multiple parameters corresponding to each of the multiple layers.

In a process in which the deep learning neural network model performs inference, the input data feature may change due to changes in the external environment. Specifically, the deep learning neural network model may perform inference under an environment different from an environment of the calibration data used in an initial quantization process, and in this case, input data having feature different from feature of the calibration data may be input to the deep learning neural networks model.

As an example, when the deep learning neural network model analyzes a captured image of the CCTV input in real time to perform a function such as object detection, a tendency of the captured image of the CCTV input in real time may vary over time.

As another example, the tendency of the input data may vary depending on the position where the deep learning neural network model performs the inference, such as in a case where the shooting angle of the image changes finely due to the change of the installation position of the CCTV, or in a case where the deep learning neural networks model is distributed to the analysis system for various positions.

Since the quantization parameter is a value determined based on a statistical distribution of activation values included in the calibration data, a quantization error increases when data having a statistical distribution different from that of the calibration data is input in an actual inference process. Therefore, it is necessary to perform quantization calibration for the deep learning neural network model and apply quantization parameters suitable for the changed input data features again.

The input feature change detector 110 analyzes input image data input to the neural network model to detect the feature change of input data caused by the change in the external environment. Here, the change in the external environment may be, but is not limited to, a change in time at which the deep learning neural network model performs inference. For example, the change in the external environment may be a change in a position at which the deep learning neural network model performs inference.

The input feature change detector 110 may perform analysis on the input image data at a preset time interval while the deep learning neural network model performs inference, in order to determine whether the feature change of input data caused by the change in the external environment occurs.

According to an embodiment, the input feature change detector 110 may perform analysis on the input image data at time intervals of 10 minutes or equal to or less than 6 hours, in order to detect the change in the external environment that varies over time, such as a change in weather over time or a change in day and night, and a change in the tendency of the data accordingly.

The features of the input image data may change depending on the change in the external environment. For example, when the deep learning neural network model is a model that performs analysis such as object detection from an image captured at a specific position in real time, differences may occur between features of image frames captured at daytime and features of image frames captured at nighttime. Thus, the statistical distribution of the input data and activation values may vary greatly depending on the time at which the deep learning neural network model performs inference. The input feature change detector 110 detects a feature change of input data based on an activation map output from any one of at least one convolution layer included in the deep learning neural network model.

Specifically, any one convolution layer of the deep learning neural network model outputs the activation maps for multiple features extracted from the input image data through multiple output channels. The input feature change detector 110 detects whether the change in the input data feature has occurred by using any one of activation maps whose activation values change according to the change in the external environment, among the multiple activation maps corresponding to the multiple output channels of the convolution layer.

For example, among the entire output channels of the convolutional layer, some channels may extract image features that are independent of the external environment, so that even if image data for different external environments is input, the difference between the output activation maps may be small. On the other hand, some other channels may extract image features that are affected by the external environment, so that when image data for different external environments is input, a completely different form of activation maps may be output. The input feature change detector 110 may determine, as a reference output channel, at least one channel which extracts image features affected by the external environment, from among all output channels of the convolution layer, and detect a feature change of input data based on the activation map output from the corresponding channel. Here, the reference output channel may be determined experimentally based on the output activation map, but is not limited thereto, and may be determined by using a separate reference output channel detection model trained in advance.

The input feature change detector 110 may arbitrarily change a bias value of the convolution layer, and detect the change in the input data feature according to whether overflow occurs in the activation map due to the changed bias value.

Since the activation values included in the activation map output from the convolution layer are values generated based on the bias value of the corresponding convolution layer determined in the training process of the deep learning neural network model, when the bias value is changed, all of the activation values of the activation maps output from the convolution layer are changed. Here, if the bias value is increased, the activation values may also be increased by the amount of change in the bias value.

The input feature change detector 110 changes the bias value of the convolution layer to a value greater than the existing value so that when image data corresponding to any one external environment of the different external environments is input, no overflow occurs in the corresponding activation map, and when image data corresponds to another external environment is input, overflow occurs in the corresponding activation map.

When the overflow is detected in the activation map for the changed bias value, the input feature change detector 110 may determine that data having the changed feature is input due to the change in the external environment.

In the present embodiment, the input feature change detector 120 is described as detecting the change in the external environment based on the activation map output from the convolution layer, but is not limited thereto, and various data capable of extracting changes in the image features that varies according to the change in the external environment may be employed.

For example, when the deep learning neural network model includes, in addition to the convolution layer, one or more layers that output a transformed image by performing filtering on the input image to remove noise or extract features from the input image, the input feature change detector 110 may be configured to detect a feature change of the input data based on the transformed image output from the corresponding layer.

When the input feature change detector 110 detects a feature change of input data, the quantization unit 120 performs quantization calibration on the deep learning neural network model to determine a new quantization parameter corresponding to the feature change of input data caused by the change in the external environment.

According to an embodiment, the quantization unit 120 may determine the new quantization parameter corresponding to all quantization parameters for the deep learning neural network model based on any one quantization parameter set corresponding to the feature change of input data caused by the change in the external environment from among pre-generated multiple quantization parameter sets. Here, the quantization parameter set means one data set including quantization parameters for activation values in all individual layers of the deep learning neural network model.

Specifically, the quantization parameter sets for each of the external environments may be generated in advance and stored in the quantization device 100 by using multiple input image data corresponding to each of the preset multiple external environments based on the input data tendency. The quantization unit 120 may determine one quantization parameter set corresponding to the current external environment, as the new quantization parameter, from among pre-generated and stored multiple quantization parameter sets.

The quantization unit 120 updates the quantization parameters for the corresponding layers of the deep learning neural network model based on the multiple quantization parameters included in the new quantization parameter set.

According to another embodiment, the quantization unit 120 may determine new input quantization parameters for the input data of the deep learning neural network model, based on the input image data having the changed feature.

Specifically, the quantization unit 120 calculates first input quantization parameters based on multiple input image data corresponding to a pre-configured time period. Here, the preset time period may be a time period corresponding to a time period from a current time point at which the input feature change detector 110 detects the feature change of input data caused by the change in the external environment, to a time point in the past by a time interval at which the input feature change detector 110 performs analysis on the input image data.

The quantization unit 120 determines an optimal quantization range capable of minimizing accuracy loss due to quantization from among the input values of all input image data corresponding to the preset time period, and calculates the first quantization parameter such as the scale factor and the value of the zero point based on a minimum value and a maximum value of input values corresponding to the determined quantization range.

The quantization unit 120 determines new input quantization parameters based on the first input quantization parameters and second input quantization parameters included in the plurality of preset quantization parameters for the deep learning neural network model. Here, the second input quantization parameters are existing input quantization parameters that are applied up to the present time for the quantization of the input data of the deep learning neural network model.

For example, when the input feature change detector 110 performs a first analysis on the input image data at a first time point according to a preset time interval, and performs a second analysis on the input images data at a second time point to detect the feature change of input data, the quantization unit 120 calculates the first input quantization parameters based on multiple image data input during a time period corresponding to the second time point at the first time point. Here, the second input quantization parameters may be an input quantization parameters determined through quantization calibration performed at the first time point or a time point before the first time point. Consequently, the second input quantization parameters are quantization parameters for input image data before the change in the external environment, and the first input quantization parameters are quantization parameters for the input image data after the change in the external environment.

The quantization unit 120 may calculate the new input quantization parameters based on the first input quantization parameters and the second input quantization parameters by using Equation 1.

$$Q_{in\_new} = \alpha \times Q_{in\_1} + \beta \times Q_{in\_2}, \ (\alpha + \beta = 1) \quad \text{[Equation 1]}$$

where Qin_new is the new input quantization parameter, Qin_1 is the first input quantization parameter, and Qin_2 is the second input quantization parameter. That is, the quantization unit 120 may determine the value of the new input quantization parameters by weight-summing the first input quantization parameters and the second input quantization parameters.

α and β are experimentally determined values according to reflection ratio for the changed features of the input image data. For example, as the value of α becomes closer to 1, the feature of the image data currently being input is more greatly reflected.

The quantization unit 120 updates the input quantization parameters of the deep learning neural network model based on the new input quantization parameters. As a result, instead of quantizing the input image data based on the second input quantization parameters, the deep learning neural network model quantizes the input image data based on the new input quantization parameters.

The memory 130 may include volatile memory, permanent, virtual, or other types of memory for storing information used by or output by the quantization device 100. For example, the memory 130 may include a RAM (random access memory) or a DRAM (dynamic RAM).

The memory 130 stores a basic program, an application program, network configuration information, and the like for the operation of the quantization device 100. Further, the memory 130 may provide stored information in response to a request from the input feature change detector 110 or the quantization unit 120.

The memory 130 may store various data for processing or controlling the input feature change detector 110 or the quantization unit 120. For example, the memory 130 may store target deep learning neural network model data for which quantization is to be performed, activation value data for each layer of the deep learning neural network model, activation map data corresponding to the input image data, multiple quantization parameter sets generated according to the external environment, and a pre-trained detection model for detecting the feature change of input data caused by the change in the external environment, and the like.

In addition, the memory 130 may store various data generated by the input feature change detector 110 or the quantization unit 120. For example, the memory 130 may store the new input quantization parameters calculated by the quantization unit 120.

Figure 2:
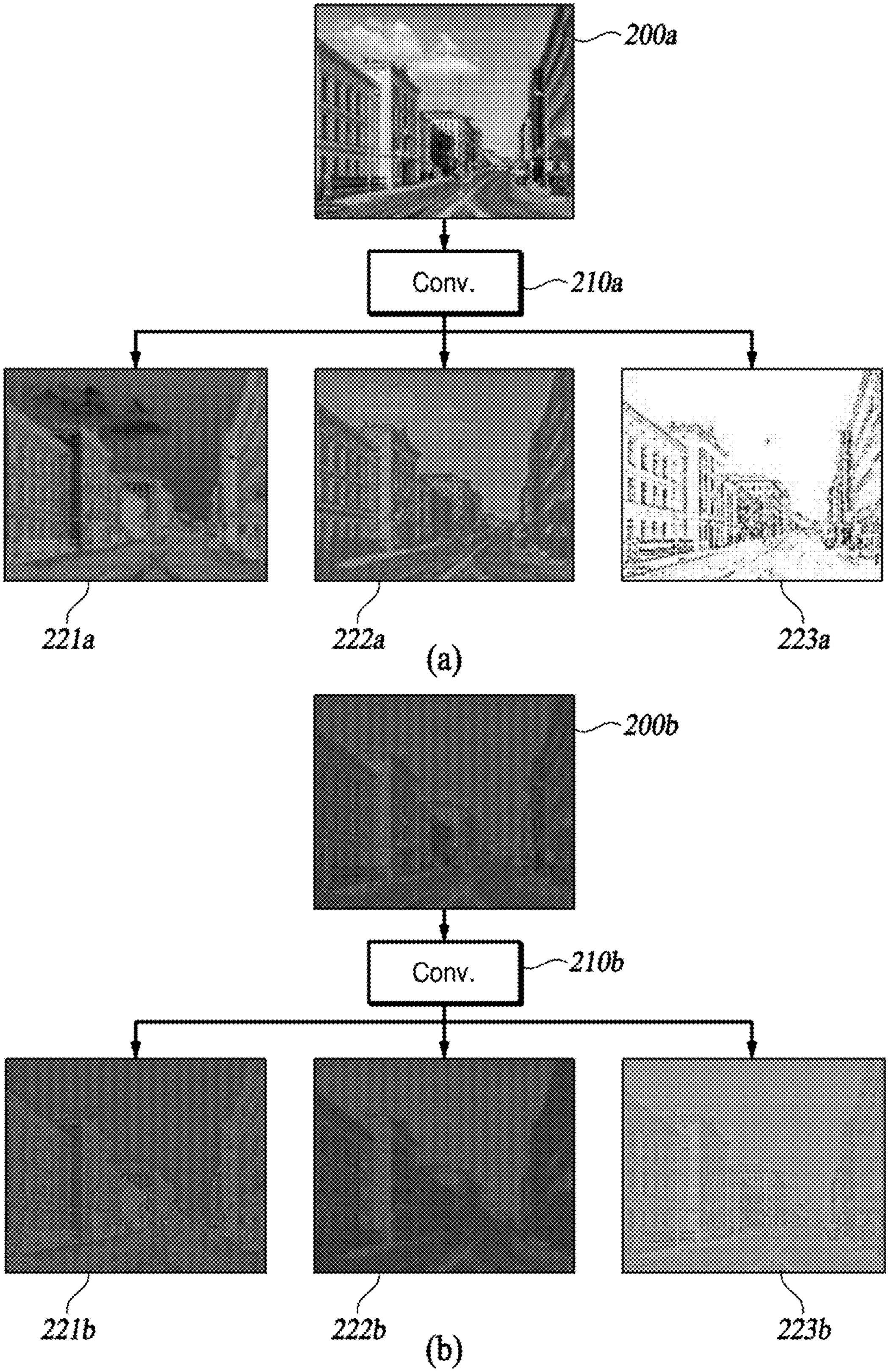
FIG. 2 is a diagram for describing a feature change of input data caused by a change in an external environment that appears in an activation map of the input image data.

FIG. 2 is a diagram for describing a feature change of input data caused by a change in an external environment that appears in an activation map of the input image data.

FIG. 2A illustrates activation map images 221*a*, 222*a*, 223*a* visualizing multiple activation maps corresponding to the daytime image data 200*a*.

Referring to FIG. 2A, when the daytime image data 200*a* is input to any one convolution layer 210*a* of the deep learning neural network model, multiple activation maps corresponding to respective channels of the convolution layer 210*a* are output. Here, the convolution layer 210*a* may be a first convolution layer of the deep learning neural network model. Although three activation maps are illustrated herein, generally a greater number of activation maps may be output.

The convolution layer 210*a* extracts various features from the daytime image data 200*a* and outputs the activation maps. A first activation map image 221*a* is output from a first channel of the convolution layer 210*a*, a second activation map image 222*a* is output from a second channel, and a third activation map image 223*a* is output from a third channel, respectively.

FIG. 2B illustrates activation map images 221*b*, 222*b*, 223*b* visualizing multiple activation maps corresponding to the nighttime image data 200*b*.

Referring to FIG. 2B, when the nighttime image data 200*b* is input to the convolution layer 210*b* of the deep learning neural network model, the convolution layer 220*b* extracts various features from the nighttime image data 200*b* and outputs activation maps. A first activation map image 221*b* is output from a first channel of the convolution layer 210*b*, a second activation map image 222*b* is output from a second channel, and a third activation map image 223*b* is output from a third channel, respectively.

Referring to FIG. 2A and FIG. 2B, a difference between activation maps output from the third channel among the activation maps for different external environments of day and night is relatively large compared to those from other channels. Specifically, the pixel value of the third activation map image 223*a* corresponding to the daytime environment are mostly represented as maximum values or values close to the maximum. On the other hand, the pixel value of the third activation map image 223*b* corresponding to the nighttime environment shows a relatively low value distribution.

The quantization device of the disclosure senses the change in the external environment based on the distribution difference between the pixel value of the third activation map image 223*a* corresponding to the daytime environment and the pixel value of the third activation map image 221*b* corresponding to the nighttime environment, both output from the third channel. For example, the quantization device may determine whether the input image data is an image for a daytime image or a nighttime image based on the number of pixels exceeding a preset threshold in the activation map image output from the third channel.

The quantization device may be configured to determine one channel having the largest difference in the activation map image from among multiple channels outputting different activation map images according to the change in the external environment, and to sense the change in the outside environment based on the pixel value of the activation map image in the corresponding channel, but is not limited thereto. For example, the quantization device may be also configured to, when one or more activation maps for the input image are input, sense changes in the external environment using a separate prediction model trained to predict the external environment for the corresponding input image.

Figure 3:
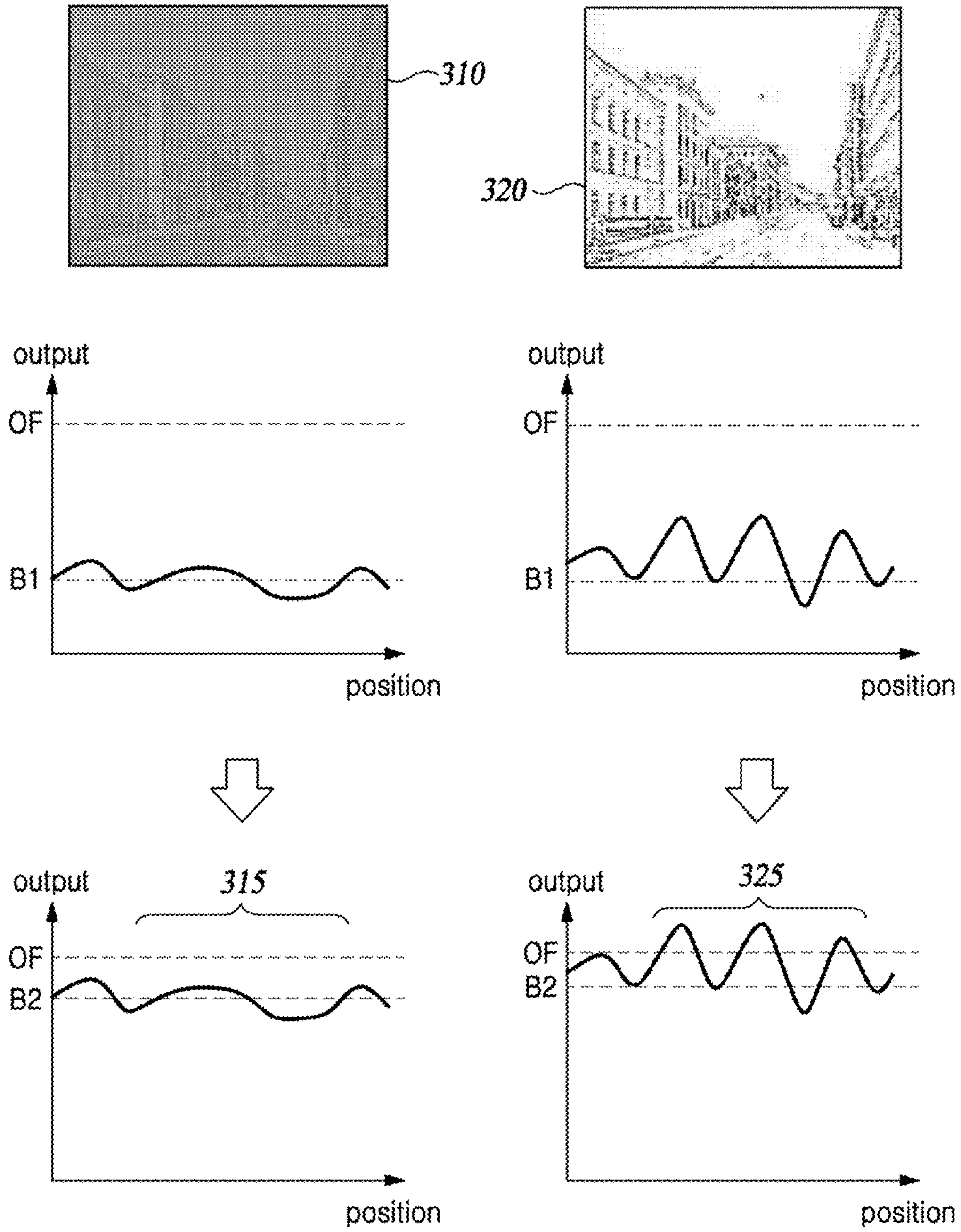
FIG. 3 is a diagram for describing a process in which a quantization device according to an embodiment of the disclosure detects a feature change of input data based on overflow occurring in an activation map.

FIG. 3 is a diagram for describing a process in which a quantization device according to an embodiment of the disclosure detects a feature change of input data based on overflow occurring in an activation map.

Referring to FIG. 3, the pixel values of the activation map image 310 for the nighttime have values similar to the first bias B1 value of the convolution layer. Here, the first bias B1 value is a bias value of the convolution layer determined in the training process of the deep learning neural network model. The pixel values of the activation map image 310 for the nighttime may be values determined based on a value obtained by multiplying the pixel value of the nighttime input image by the weights of the convolution layer and adding the first bias B1 value thereto.

On the other hand, the pixel values of an activation map image 320 corresponding to the daytime appear mostly in a distribution of values greater than pixel values of the activation map image 310 for the nighttime. Due to the brightness feature of the input image data over time, the pixel value of the input image at the daytime has a higher brightness value than those at the nighttime, and thus the distribution of the pixel values of the activation map image 320 corresponding to the daytime also has a greater value distribution.

In a computation process of a system, when a computed result exceeds an allowable value range and is stored as a value completely different from the actual value, overflow may occur and cause unexpected problems in the system. Accordingly, most computation processes of system check whether the overflow has occurred, and if the computed result value has a value greater than the allowed value, a message indicating that an overflow error has occurred is output.

When the first bias B1 of the convolution layer is changed to a second bias B2 having a greater value, the pixel value distribution of the activation map image 310 also becomes a distribution of greater values due to the addition of the bias having a greater value in the computation process of the convolution layer. Here, the pixel values of the activation map image 320 for the daytime have a value that is mostly greater than the pixel values of the activation map image 310 for the nighttime, and thus may appear as a value that is greater than a preset overflow threshold OF.

Specifically, when the bias value is changed from the first bias B1 to the second bias B2, the pixel value distribution 315 of the activation map image 310 for the nighttime has a greater value than before the bias change, but still is formed in a range lower than the overflow threshold OF. On the other hand, as a result of the pixel value distribution 325 of the activation map image 320 for the daytime having a greater value than before the bias change, some values appear as a value greater than the overflow threshold OF. Consequently, under the condition of the changed second bias B2, overflow may occur only in the activation map image 320 for the daytime.

The quantization device may artificially change the bias value of the convolution layer and recognize the change in the features of the input data depending on whether an overflow occurs. Here, the quantization device is configured to identify two different external environments depending on whether overflow occurs with the changed bias value, but is not limited thereto. For example, the quantization device may be configured to identify three or more external environments based on the number or combination of activation maps in which the overflow error occurs, among preset multiple activation maps.

Figure 4:
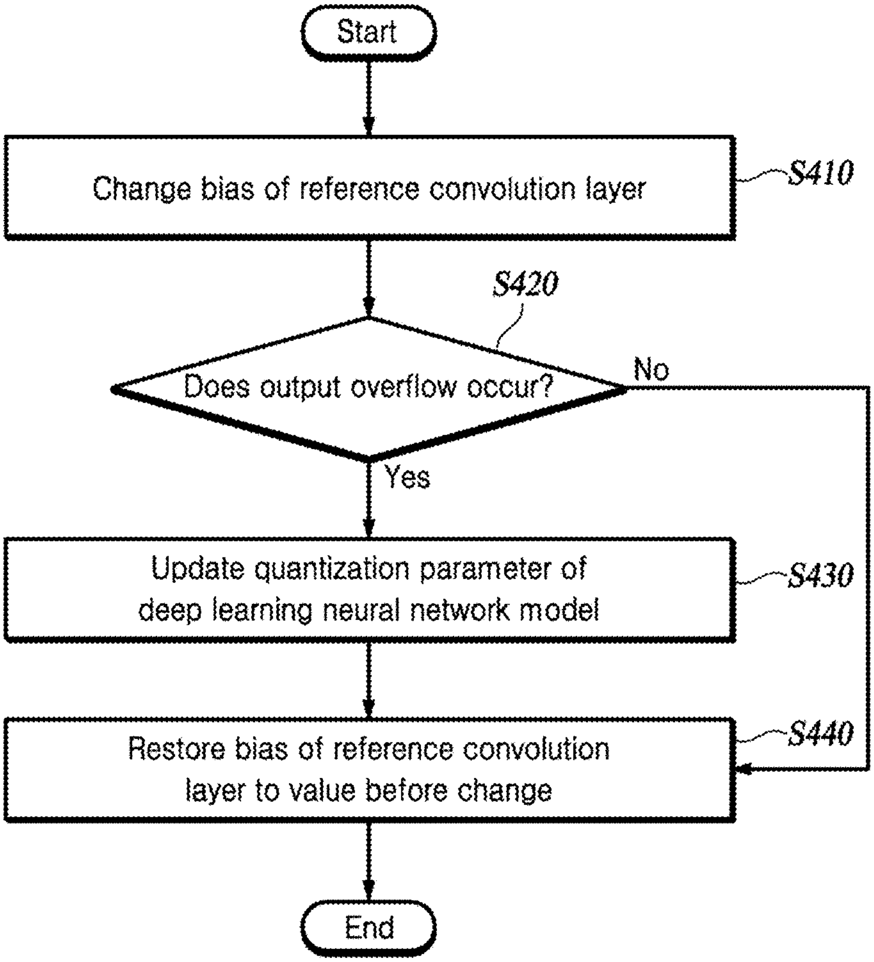
FIG. 4 is a flowchart for describing a process in which a quantization device according to an embodiment of the disclosure changes a bias value of any one convolution layer.

FIG. 4 is a flowchart for describing a process in which a quantization device according to an embodiment of the disclosure changes a bias value of any one convolution layer.

Referring to FIG. 4, the quantization device changes a bias of a reference convolution layer of the deep learning neural network model (S410). Here, the reference convolution layer may be a first convolution layer among multiple convolution layers included in the deep learning neural network model.

The quantization device changes the bias value of the reference convolution layer determined in the training process of the deep learning neural network model, to any larger value. Here, the changed bias value may be determined based on parameters of the deep learning neural network model or hardware specifications of the quantization device, and may be a value set such that activation values of the corresponding convolution layer do not cause overflow in the first external environment but cause overflow in the second external environment, among different multiple external environments.

The quantization device checks whether overflow occurs in the output of the reference convolution layer (S420). When an overflow error does not occur in the activation map output from the reference convolution layer, since there is no significant change in the features of the input image data, the quantization device determines that there is no change in the external environment, and recovers the bias value of the reference convolution layer arbitrarily changed to the bias value before the change (S440).

When an overflow error occurs in the activation map output from the reference convolution layer, the features of the input image data are significantly changed, so that the quantization device determines that the change in the external environment has occurred.

Due to the change in the external environment, a difference may occur between the features of the image currently input to the deep learning neural network model and the features of the calibration image used in the process of determining the existing quantization parameter. If computation is performed on the input image having the changed features using the existing quantization parameters, the quantization error increases.

The quantization device performs quantization calibration on the deep learning neural network model to determine new quantization parameters. The quantization device may determine one or more new quantization parameters for the deep learning neural network model by using input image data having the changed features caused by the changes in the external environment as calibration data. Here, the new quantization parameters may be multiple quantization parameters included in one quantization parameter set corresponding to the current external environment, or may be the input quantization parameters used to quantize new input image data.

The quantization device updates the quantization parameters of the deep learning neural network model to the new quantization parameters (S430). When the quantization parameter is updated, the quantization device recovers the bias of the reference convolution layer that has been arbitrarily changed to the value before the change so that the deep learning neural network model may operate normally (S440).

Figure 5:
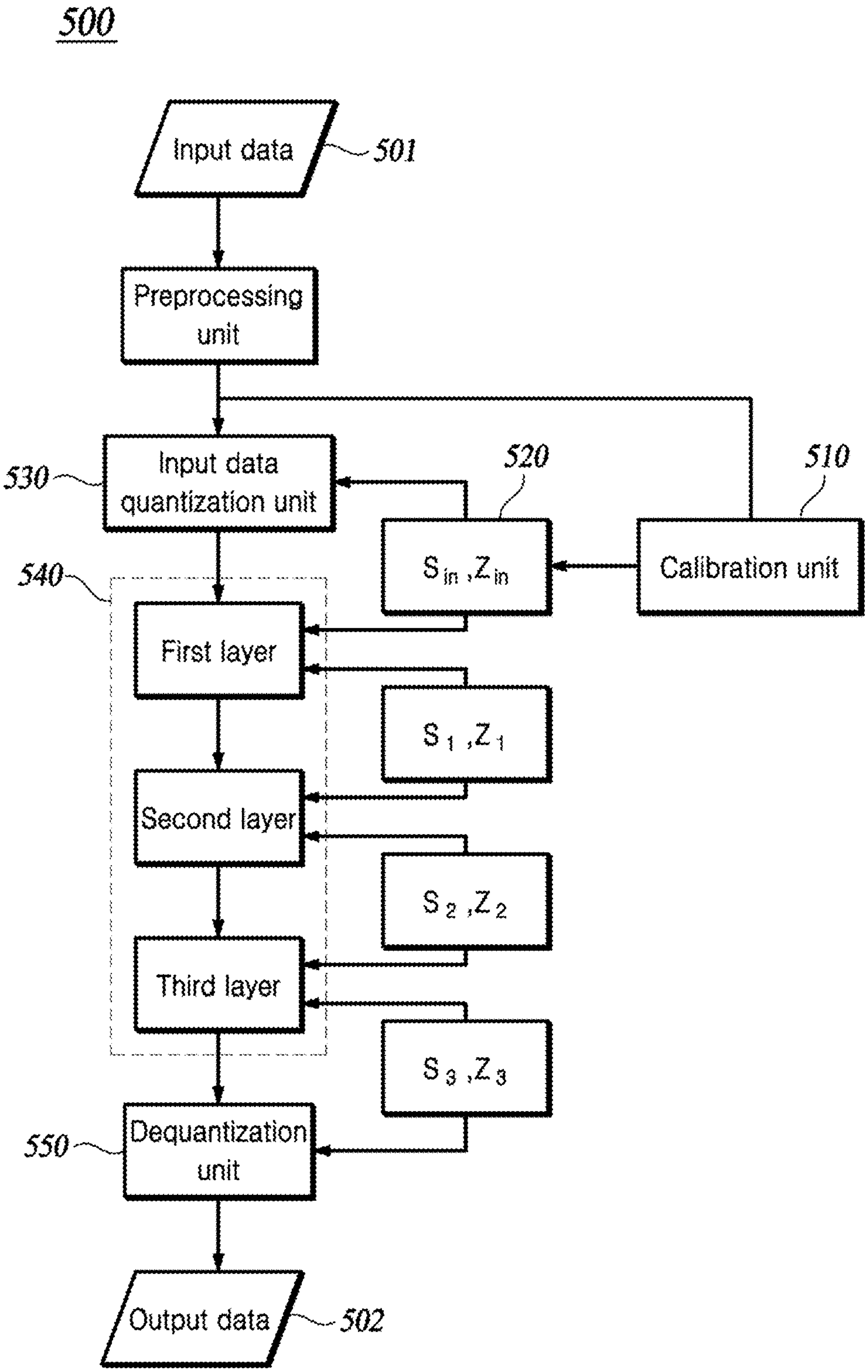
FIG. 5 is a diagram for describing a process in which a quantization device according to an embodiment of the disclosure updates quantization parameters of a deep learning neural network model.

FIG. 5 is a diagram for describing a process in which a quantization device according to an embodiment of the disclosure updates quantization parameters of a deep learning neural network model.

Referring to FIG. 5, the quantization device 500 includes a calibration unit 510, an input data quantization unit 530, a target deep learning neural network 540, and a dequantization unit 550. Here, the target deep learning neural network 540 includes multiple layers included in the deep learning neural network model, for example, a first layer, a second layer, and a third layer.

When input data 501 of the deep learning neural network model is input to the input data quantization unit 530 through preprocessing, the input data quantization unit 530 quantizes the input data 501 by using preset input quantization parameters Sin, Zin, 520. For example, the input data 501 in the FP32 real number format is quantized into a value in the integer format.

When the quantized input data 501 is input to the first layer of the deep learning neural network model, the quantization device 500 quantizes an activation value of the first layer by using the preset first quantization parameters S1, Z1. In a similar manner, the quantization device 500 quantizes an activation value of the second layer by using the preset second quantization parameters S2, Z2, and quantizes an activation value of the third layer by using the third quantization parameters S3, Z3.

The dequantization unit 550 dequantizes a quantized value of a final output of the deep learning neural network model to generate output data 502. For example, the dequantization unit 550 dequantizes a quantized value in the integer format into a corresponding real number value in the FP32 format.

When the quantization device 500 detects the feature change of input data caused by the change in the external environment in a process in which the deep learning neural network model performs inference, the calibration unit 510 updates the input quantization parameters of the deep learning neural networks model based on the input image data having the changed features.

The calibration unit 510 calculates the first input quantization parameters based on multiple input data 501 corresponding to the preset time period. Here, the multiple input data 501 may include multiple image frames input to the deep learning neural network model during the preset time period.

The calibration unit 510 may determine a quantization range of the input data, that is, a range of real number values of the input data mapped to the quantized value range in the integer format, based on one statistical feature for all of the multiple input data 501. For example, the calibration unit 510 determines an optimal quantization range capable of minimizing accuracy loss due to quantization among pixel values of all image frames included in the multiple input data 501, and calculates the first input quantization parameters such as a scale factor and a value of a zero point, based on a minimum value and a maximum value of the pixel values corresponding to the determined quantization range.

The calibration unit 510 may determine new input quantization parameters based on the first input quantization parameters and the preset second input quantization parameters Sin, Zin, 520. The calibration unit 510 updates the preset input quantization parameters Sin, Zin, 520 to the new input quantization parameters.

When the data to which the new input quantization parameters are applied cannot be immediately input to the first layer, which is the next step, due to a time required in the quantization process of the input data quantization unit 530, the quantization device 500 may first update the quantization parameters with respect to the input data quantization unit 530, and adjust the update time point to update the quantization parameter with respect to an input of the first layer at a time delayed by the time required in a quantization process. For example, the quantization device 500 may sequentially perform updates of the quantization parameters with respect to the input data quantization unit 530 and the first layer in a method as shown in Table 1.

TABLE 1

| time | $T_2 - 1$ | $T_2$ | $T_2 + 1$ | $T_2 + 2$ | .... | $T_2 + Z$ |
|---|---|---|---|---|---|---|
| input data quantization unit | $S_{in}(t = T_1)$ $Z_{in}(t = T_1)$ | | | $S_{in}(t = T_2)$ $Z_{in}(t = T_2)$ | | |
| first layer | | | $S_{in}(t = T_1)$ $Z_{in}(t = T_1)$ | | | $S_{in}(t = T_2)$ $Z_{in}(t = T_2)$ |

Here, T1 is a first time point at which the preset input quantization parameters are determined, and T2 is a second time point at which the calibration unit 510 determines new input quantization parameters in response to the change in the features of the input data. z is a time required in the quantization process of the input data quantization unit 530, and may generally be a time corresponding to 1 to 10 clock cycles of an computating device to which the deep learning neural network model is applied. z may be an extremely short time compared to the time period between the first time point and the second time point.

As shown in Table 1, the quantization device 500 applies the new input quantization parameters only to the input data quantization unit 530 for z hours, which is a time required for performing quantization in the input data quantization unit 530, from the second time point T2, and applies the existing input quantization parameters, that is, quantization parameters determined at the first time point, to data input to the first layer before the T2+z time point arrives.

After the time z has elapsed, from the time point T2+z, the input data to which the new input quantization parameters are applied will be input to the first layer, so that the quantization device 500 also applies the new input quantization parameters to the input end of the first layer. Thus, the input quantization parameters of the deep learning neural network model may be seamlessly updated.

Figure 6:
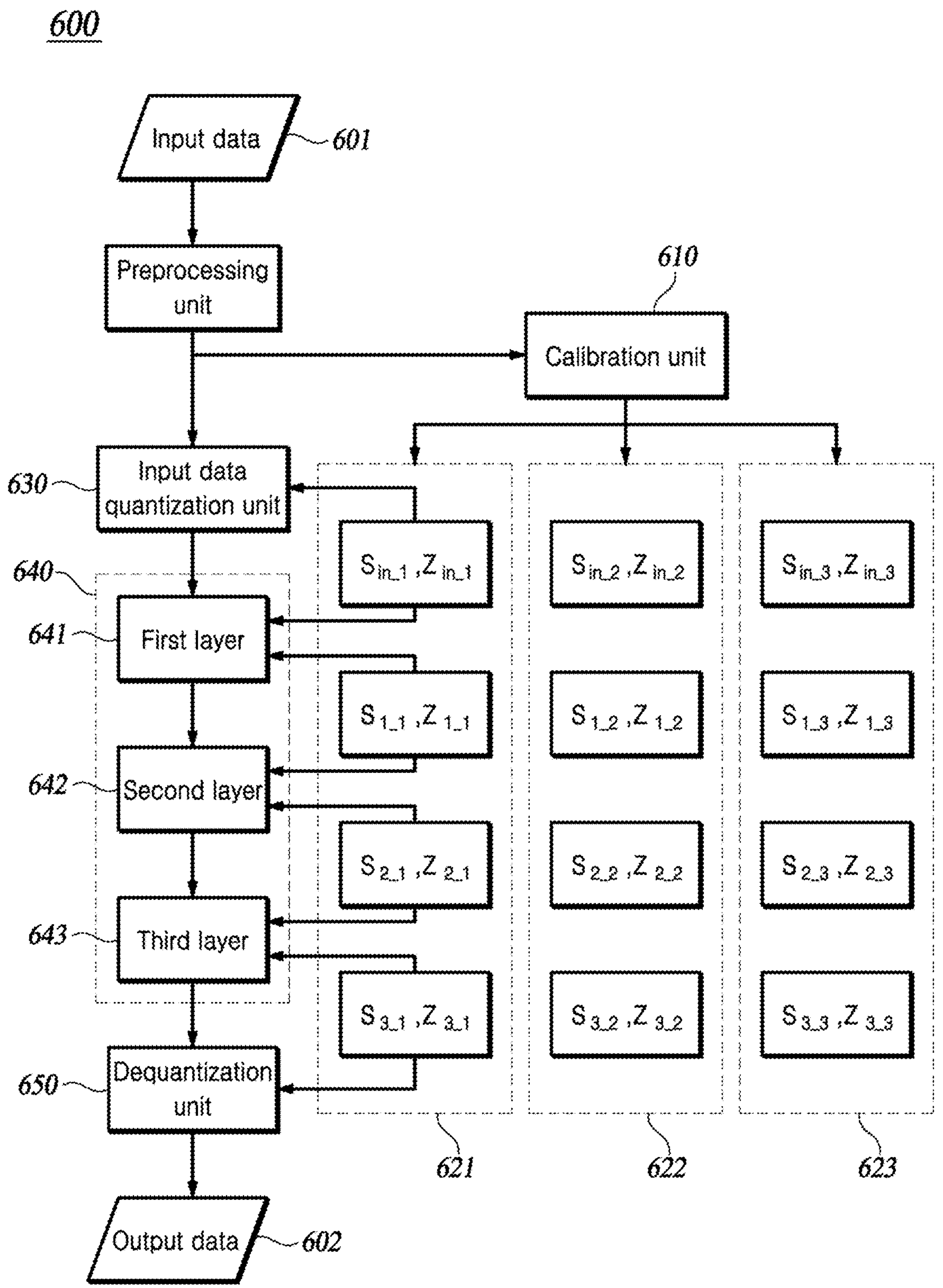
FIG. 6 is a diagram for describing a process in which a quantization device according to other embodiment of the disclosure updates quantization parameters of a deep learning neural network model.

FIG. 6 is a diagram for describing a process in which a quantization device according to another embodiment of the disclosure updates quantization parameters of a deep learning neural network model.

Referring to FIG. 6, the quantization device 600 includes a calibration unit 610, an input data quantization unit 630, a target deep learning neural network 640, and a dequantization unit 650. Here, the target deep learning neural network 640 includes multiple layers included in the deep learning neural network model, for example, a first layer 641, a second layer 642, and a third layer 643.

When the input data 601 is input to the input data quantization unit 630 through preprocessing, the input data quantization unit 630 quantizes the input data 601, using the input quantization parameters Sin_1, Zin_1 of a first quantization parameter set 621 including the plurality of preset quantization parameters. The quantized input data 601 is input to the target deep learning neural network 640, and the deep learning neural network model performs inference on the input data 601.

In the computation process for inference, the activation values output from the individual layers are quantized and computated based on the corresponding activation parameters in the first quantization parameter set 621. Specifically, the activation value of the first layer 641 is quantized based on the first layer quantization parameters S1_1 and Z1_1 of the first quantization parameter set 621. In the same way, the activation value of the second layer 642 is quantized based on second layer quantization parameters S2_1, Z2_1 of the first quantization parameter set 621, and the activation value of a third layer 643 is quantized based on third layer quantization parameters S3_1, Z3_1 of the first quantum parameter set 621.

The dequantization unit 650 dequantizes the quantized value of the final output of the deep learning neural network model to generate output data 602.

When the quantization device 600 detects the feature change of input data caused by the change in the external environment in the process of performing the inference by the deep learning neural network model, the calibration unit 610 updates the quantization parameters of the deep learning neural network model based on any one quantization parameter set corresponding to the feature change of input data caused by the change in the external environment among pre-generated multiple quantization parameter sets 621, 622, 623.

The multiple quantization parameter sets 621, 622, 623 may include quantization parameters for activation values of all individual layers of the deep learning neural network model corresponding to each of the multiple external environments. Specifically, quantization calibration may be performed by using multiple input data corresponding to any one of the preset multiple external environments as calibration data, and one quantization parameter set may be generated by determining the quantization parameters of all individual layers of the deep learning neural network model corresponding to that external environment.

For example, with respect to input image data which are image frames captured at a specific position, the first quantization parameter set 621 specialized for daytime image features may be generated by performing quantization calibration using multiple images captured during the daytime. In a similar manner, the second quantization parameter set 622 specialized for image features at nighttime and the third quantization parameter set 623 specialized for indoor lighting image features may be generated, respectively.

The quantization device 600 may update the quantization parameters of the deep learning neural network model by selectively applying any one quantization parameter set corresponding to the current external environment from among the first quantization parameter set 621, the second quantization parameter set 622, and the third quantization parameter set 623 generated in advance according to the sensed change in the external environment.

For example, when the feature change of input data s are sensed due to nighttime image features while the deep learning neural network model is in a state of being quantized based on the first quantization parameter set 621 specialized for daytime image features, the quantization device 600 updates all quantization parameters from the input quantization parameters to the third layer quantization parameters collectively by using the second quantization parameter set 622 specialized for nighttime image features.

When the quantization parameters are updated from the first quantization parameter set to the second quantization parameter setting 622, the input data quantization unit 630 of the deep learning neural network model quantizes the input data 601 by using the input quantization parameters Sin_2, Zin_2 of the second quantization parameter set 622. In addition, the activation value of the first layer 641 is quantized based on the first layer quantization parameters S1_2, Z1_2 of the second quantization parameter set 622, the activation value of the second layer 642 is quantized based on the second layer quantization parameters S2_2, Z2_2 of the second quantization parameter set 622, and the activation value of the third layer 643 is quantized based on the third layer quantization parameters S3_2, Z3_2 of the second quantization parameter set 622, respectively.

Figure 7:
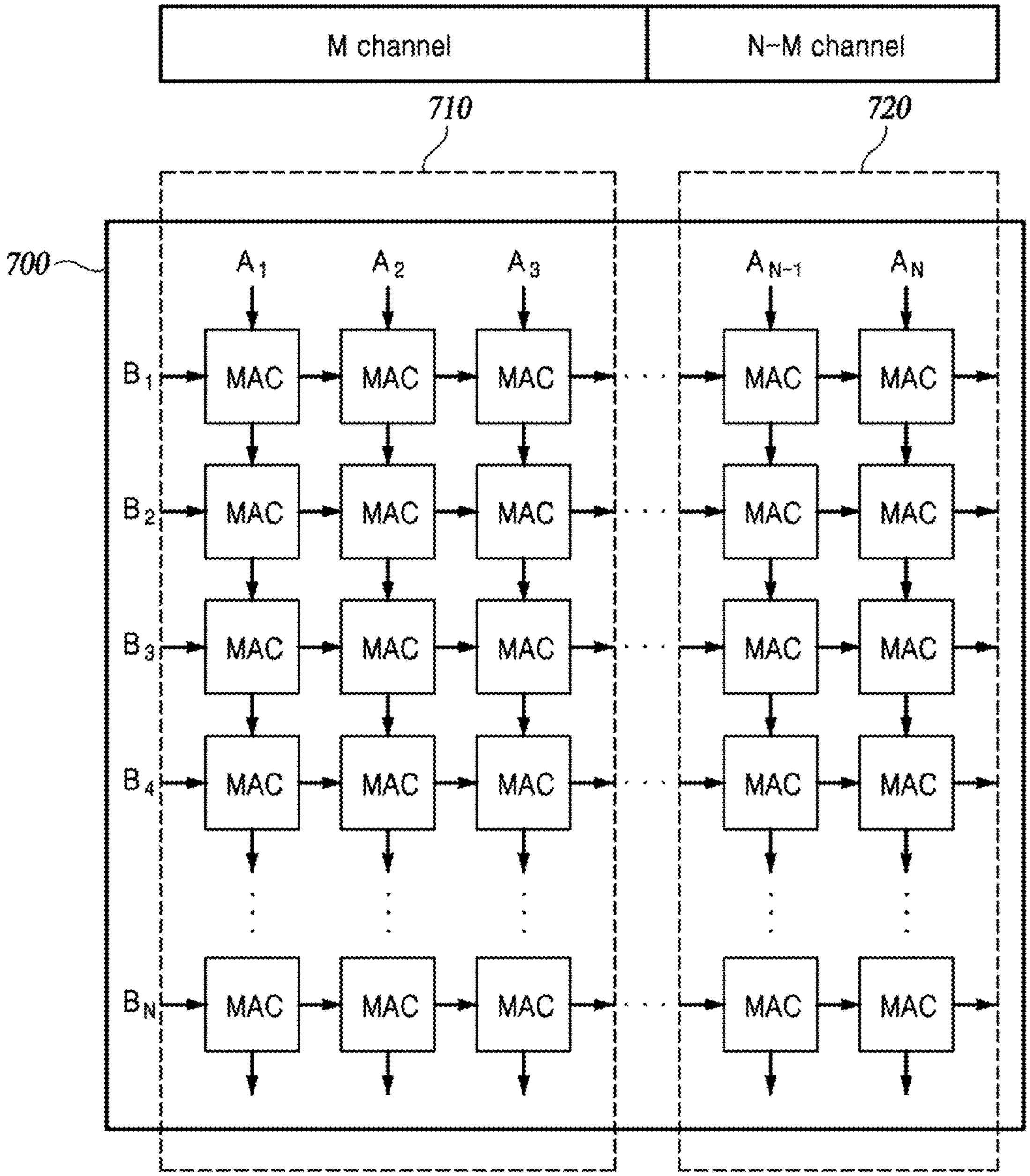
FIG. 7 is a diagram for describing an input feature change detector of a quantization device according to still other embodiment of the disclosure.

FIG. 7 is a diagram for describing an input feature change detector of a quantization device according to still other embodiment of the disclosure.

Referring to FIG. 7, a parallel processor 700 that performs computations of a quantized deep learning neural network model is disclosed. Here, the parallel processor 700 may be a parallel processor having a systolic array structure including N channels.

The parallel processor having the systolic array structure is widely applied to accelerators for computations of deep learning neural network model. Such parallel processor 700 simultaneously processes N inputs input through each of the N channels. For example, N input data and multiple weight values for the convolution layer of the deep learning neural network model are loaded into an on-chip memory (not shown) constituting the parallel processor 700, and parallel computations are performed on the N input data to output an activation map for the corresponding convolution layer.

When data having a size smaller than N, that is, M data where M is less than N, are input to the parallel processor 700, the parallel processor 700 allocates only the M channel regions 710 to the computations of the deep learning neural network model. For example, M inputs are respectively input through the channels A1 to AM, and computations of the deep learning neural network model are performed using a plurality of MACs (Multiply and Accumulate Units) constituting each channel.

The input feature change detector of the quantization device may perform computations for detecting the feature change of input data caused by the change in the external environment by using at least one channel among the remaining channels, i.e., the N−M channel regions 720, except for the M channels allocated to the computation of the deep learning neural network model from among the N channels of the parallel processor 700.

For example, when the parallel processor 700 is a systolic array having a size of 64×64 and the number of channels of the deep learning neural network model is 32, 32 channels out of 64 channels of the parallel processor 700 perform computations of the quantized deep learning neural network model. Then, the activation map output from the convolution layer with the changed bias may be input to one or more channels among the remaining 32 channels to perform detection of overflow. In addition, when the input feature change detector of the quantization device is a detection model trained to predict the feature change of input data caused by the change in the external environment from one or more activation maps, one or more channels among the remaining 32 channels may be allocated to the computation of that detection model.

As described above, the input feature change detector of the quantization device directly utilizes the resources of one parallel processor 700 for the computations of the deep learning neural network model as-is, and thus may be implemented without a separate hardware configuration. Therefore, the quantization device enables light-weighting and miniaturization of the entire AI accelerator device including the quantization device.

Figure 8:
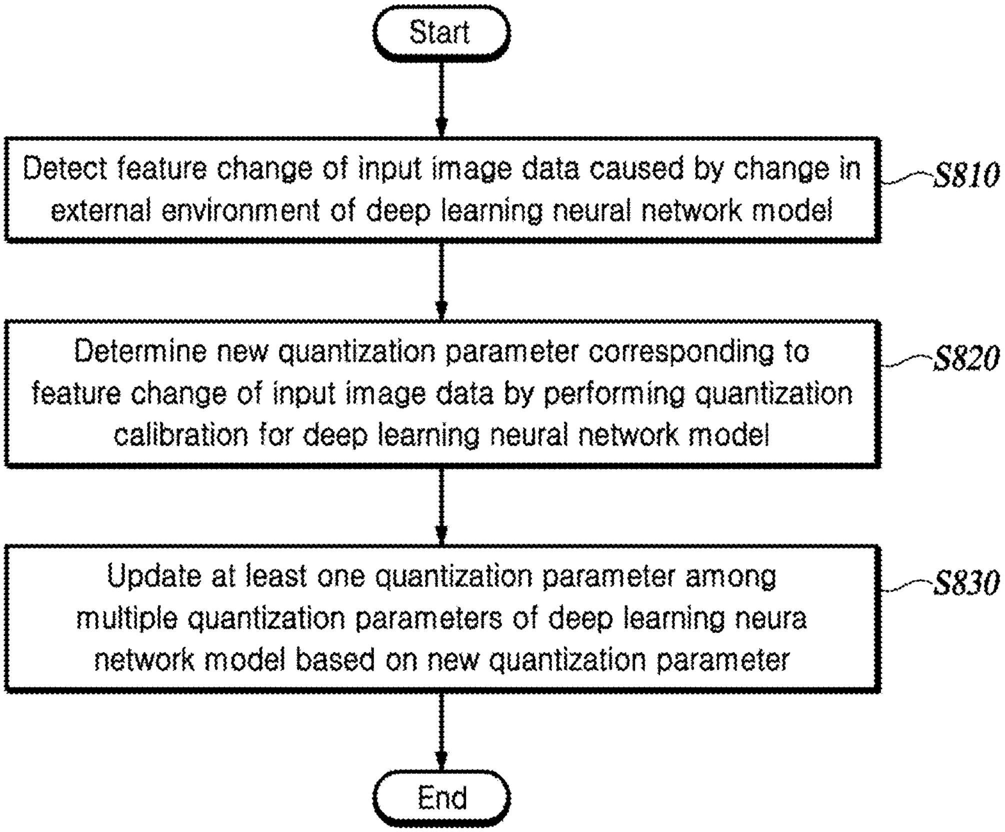
FIG. 8 is a flowchart for describing a quantization method according to an embodiment of the disclosure.

FIG. 8 is a flowchart for describing a quantization method according to an embodiment of the disclosure.

Referring to FIG. 8, the quantization device detects the input image data feature change caused by the change in the external environment of the deep learning neural network model (S810).

The input data and the activation values output from each layer of the deep learning neural network model are quantized based on preset quantization parameters. The plurality of preset quantization parameters may include input quantization parameters included in the deep learning neural network model and quantization multiple parameters corresponding to each of the multiple layers.

In a process in which the deep learning neural network model performs inference, the input data feature may change due to changes in the external environment. Specifically, the deep learning neural network model may perform inference under an environment different from an environment of the calibration data used in the initial quantization process, and in this case, input data having feature different from feature of the calibration data may be input to the deep learning neural networks model.

The quantization device analyzes input image data input to the neural network model to detect the feature change of input data caused by the change in the external environment. Here, the change in the external environment may be, but is not limited to, the change in time at which the deep learning neural network model performs inference. For example, the change in the external environment may be the change in the position at which the deep learning neural network model performs inference.

The quantization device may perform analysis on the input image data at a preset time interval while the deep learning neural network model performs inference, in order to determine whether the feature change of input data caused by the change in the external environment occurs.

According to an embodiment, the quantization device may perform analysis on the input image data at time intervals of 10 minutes or equal to or less than 6 hours, in order to detect the change in the external environment that varies over time, such as the change in weather over time or a change in day and night, and the change in the tendency of the data accordingly.

the statistical distribution of the input data and activation values may vary greatly depending on the time at which the deep learning neural network model performs inference. The quantization device detects the feature change of input data based on the activation map output from any one of at least one convolution layer included in the deep learning neural network model. Specifically, the quantization device detects whether the change in the input data feature has occurred by using any one of activation maps whose activation values change according to the change in the external environment, among the multiple activation maps corresponding to the multiple output channels of the convolution layer.

The quantization device may determine, as the reference output channel, at least one channel which extracts image features affected by the external environment, from among all output channels of the convolution layer, and detect the feature change of input data based on the activation map output from the corresponding channel. Here, the reference output channel may be determined experimentally based on the output activation map, but is not limited thereto, and may be determined by using the separate reference output channel detection model trained in advance.

The quantization device may arbitrarily change the bias value of the convolution layer, and detect the change in the input data feature according to whether overflow occurs in the activation map due to the changed bias value.

The quantization device changes the bias value of the convolution layer to a value greater than the existing value so that when image data corresponding to any one external environment of the different external environments is input, no overflow occurs in the corresponding activation map, and when image data corresponds to another external environment is input, overflow occurs in the corresponding activation map.

When the overflow is detected in the activation map for the changed bias value, the quantization device may determine that data having the changed feature is input due to the change in the external environment.

When the change in the input data feature is detected, the quantization device performs quantization calibration on the deep learning neural network model to determine the new quantization parameters corresponding to the input image data feature change (S820).

According to an embodiment, the quantization device may determine the new quantization parameter corresponding to all quantization parameters for the deep learning neural network model based on any one quantization parameter set corresponding to the feature change of input data caused by the change in the external environment from among pre-generated multiple quantization parameter sets. Here, the quantization parameter set means one data set including quantization parameters for activation values in all individual layers of the deep learning neural network model.

Specifically, the quantization parameter sets for each of the external environments may be generated in advance and stored in the quantization device by using multiple input image data corresponding to each of the preset multiple external environments based on the input data tendency. The quantization unit 120 may determine one quantization parameter set corresponding to the current external environment, as the new quantization parameter of the deep learning neural network model, from among pre-generated and stored multiple quantization parameter sets.

According to another embodiment, the quantization device may determine the new input quantization parameters for the input data of the deep learning neural network model, based on the input image data having the changed feature.

Specifically, the quantization device calculates the first input quantization parameters based on multiple input image data corresponding to the preset time period. Here, the preset time period may be the time period corresponding to the time period from the current time point at which the quantization device detects the feature change of input data caused by the change in the external environment, to the time point in the past by a preset time period for performing analysis on the input image data.

The quantization device determines the optimal quantization range capable of minimizing accuracy loss due to quantization from among the input values of all input image data corresponding to the preset time period, and calculates the first quantization parameter such as the scale factor and the value of the zero point based on the minimum value and the maximum value of input values corresponding to the determined quantization range.

The quantization device determines the new input quantization parameters based on the first input quantization parameters and the second input quantization parameters included in the plurality of preset quantization parameters for the deep learning neural network model. Here, the second input quantization parameters are the existing input quantization parameters that are applied up to the present time for the quantization of the input data of the deep learning neural network model. Consequently, the second input quantization parameters are the quantization parameters for input image data before the change in the external environment, and the first input quantization parameters are the quantization parameters for the input image data after the change in the external environment.

The quantization device may determine the value of the new input quantization parameters by weight-summing the first input quantization parameters and the second input quantization parameters.

The quantization device updates at least one quantization parameter among the multiple quantization parameters of the deep learning neural network model based on the new quantization parameters (S830).

According to an embodiment, when the quantization device determines any one quantization parameter set of the pre-generated multiple quantization parameter sets as the new quantization parameter, the quantization device updates the quantization parameters of the corresponding layers of the deep learning neural network model based on the new quantization parameters for the multiple individual layers included in that quantization parameter set.

According to another embodiment, when the quantization device calculates new input quantization parameters, the quantization device resets the new input quantization parameter as the input quantization parameter of the deep learning neural network model. As a result, the deep learning neural network model quantizes the input image data based on the new input quantization parameter, instead of quantizing the input image data based on the existing second input quantization parameters.

Various embodiments of systems and techniques described herein can be realized with digital electronic circuits, integrated circuits, field programmable gate arrays (FPGAs), application specific integrated circuits (ASICs), computer hardware, firmware, software, and/or combinations thereof. The various embodiments can include implementation with one or more computer programs that are executable on a programmable system. The programmable system includes at least one programmable processor, which may be a special purpose processor or a general purpose processor, coupled to receive and transmit data and instructions from and to a storage system, at least one input device, and at least one output device. Computer programs (also known as programs, software, software applications, or code) include instructions for a programmable processor and are stored in a "computer-readable recording medium."

The computer-readable recording medium may include all types of storage devices on which computer-readable data can be stored. The computer-readable recording medium may be a non-volatile or non-transitory medium such as a read-only memory (ROM), a random access memory (RAM), a compact disc ROM (CD-ROM), magnetic tape, a floppy disk, or an optical data storage device. In addition, the computer-readable recording medium may further include a transitory medium such as a data transmission medium. Furthermore, the computer-readable recording medium may be distributed over computer systems connected through a network, and computer-readable program code can be stored and executed in a distributive manner.

Although operations are illustrated in the flowcharts/timing charts in this specification as being sequentially performed, this is merely an exemplary description of the technical idea of one embodiment of the present disclosure. In other words, those skilled in the art to which one embodiment of the present disclosure belongs may appreciate that various modifications and changes can be made without departing from essential features of an embodiment of the present disclosure, that is, the sequence illustrated in the flowcharts/timing charts can be changed and one or more operations of the operations can be performed in parallel. Thus, flowcharts/timing charts are not limited to the temporal order.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof.

What is claimed is:

1. A quantization method comprising:

detecting a feature change of input data caused by a change in an external environment, from input image data of a deep learning neural network model quantized based on a plurality of preset quantization parameters, wherein the external environment is an environment that is external to the deep learning neural network model, wherein the change in the external environment occurs when the deep learning neural network performs an inference in an environment different from an environment corresponding to a calibration data used in an initial quantization process, wherein detecting the feature change comprises detecting whether a change in the input data occurred using any one of a plurality of activation maps of the deep learning neural network model whose activation value changes according to the change in the external environment, and wherein detecting the feature change further comprises changing, during the inference, a bias value of any one convolution layer determined in a training process for the quantized deep learning neural network model from a first value to a second value, and detecting the feature change based on determining an overflow occurring in the any one activation map due to changing the bias value from the first value to the second value;

performing quantization calibration for the deep learning neural network model to determine a new quantization parameter corresponding to the feature change of input data caused by the change in the external environment; and updating at least one of the plurality of preset quantization parameters based on the new quantization parameter.

2. The quantization method of claim 1, wherein the feature change of input data caused by the change in the external environment is a change that occurs in response to a change in time at which the deep learning neural network model performs inference.

3. The quantization method of claim 1, wherein the feature change of input data caused by the change in the external environment is a change that occurs in response to a change in a position at which the deep learning neural network model performs inference.

4. The quantization method of claim 1, wherein detecting the feature change of input data caused by the change in the external environment, from input image data of the quantized deep learning neural network model based on the plurality of preset quantization parameters is performed at a preset time interval while the deep learning neural network model performs inference.

5. The quantization method of claim 1, wherein the deep learning neural network model is a deep learning neural network model comprising at least one convolution layer.

6. The quantization method of claim 5, wherein detecting the feature change of input data caused by the change in the external environment, from input image data of the quantized deep learning neural network model based on the plurality of preset quantization parameters comprises detecting the feature change of input data caused by the change in the external environment based on the any one activation map of any one of the at least one convolution layer.

7. The quantization method of claim 1, wherein the activation map is an activation map, among activation maps corresponding to a plurality of output channels of the any one convolutional layer, in which an activation value changes according to the external environmental change.

8. The quantization method of claim 1, wherein performing quantization calibration for the deep learning neural network model to determine a new quantization parameter corresponding to the feature change of input data caused by the change in the external environment comprises:

calculating first input quantization parameters based on a plurality of input image data corresponding to a preset time section; and determining a new input quantization parameter based on the first input quantization parameters and a second input quantization parameter included in the plurality of preset quantization parameters.

9. The quantization method of claim 1, wherein performing quantization calibration for the deep learning neural network model to determine a new quantization parameter corresponding to the feature change of input data caused by the change in the external environment comprises:

determining any one quantization parameter set corresponding to the feature change of input data among a plurality of pre-generated quantization parameter sets.

10. The quantization method of claim 9, wherein the plurality of pre-generated quantization parameter sets comprise quantization parameters for a plurality of layers of the deep learning neural network model determined based on input image data corresponding to individual external environments among a plurality of preset external environments.

11. A quantization device comprising a processor configured to:

detect a feature change of input data caused by a change in an external environment in a deep learning neural network model quantized based on a plurality of preset quantization parameters, wherein the external environment is an environment that is external to the deep learning neural network model, wherein the change in the external environment occurs when the deep learning neural network performs an inference in an environment different from an environment corresponding to a calibration data used in an initial quantization process, wherein the processor is further configured to detect the feature change by detecting whether a change in the input data occurred using any one of a plurality of activation maps of the deep learning neural network model whose activation value changes according to the change in the external environment, and wherein the processor is further configured to detect the feature change further by changing, during the inference, a bias value of any one convolution layer determined in a training process for the quantized deep learning neural network model from a first value to a second value, and detecting the feature change is based on determining an overflow occurring in the any one activation map due to changing the bias value from the first value to the second value; and perform quantization calibration for the deep learning neural network model to determine a new quantization parameter corresponding to the feature change of input data caused by the change in the external environment as detected by the processor, and to update at least one quantization parameter among the plurality of preset quantization parameters based on the new quantization parameter.

12. The quantization device of claim 11, wherein the processor is further configured to perform an operation for detecting the feature change of input data caused by the change in the external environment using at least one channel among remaining channels excluding M channels allocated for operation of the deep learning neural network model among N channels of a parallel processor that performs operation of the deep learning neural network model.

13. The quantization device of claim 12, wherein the parallel processor is a parallel processor having a systolic array structure.

* * * * *